Aug. 26, 1969   R. KREMP ET AL   3,463,069
PHOTOGRAPHIC CAMERA FOR DAYLIGHT AND FLASH OPERATION
Filed Aug. 23, 1966   3 Sheets-Sheet 2

INVENTOR.
RUDOLF KREMP
KARL WAGNER
DIETER ENGELSMANN
ALFRED WINKLER

Michael S. Striker

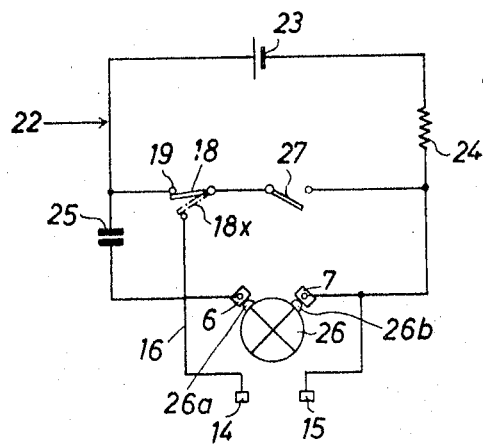
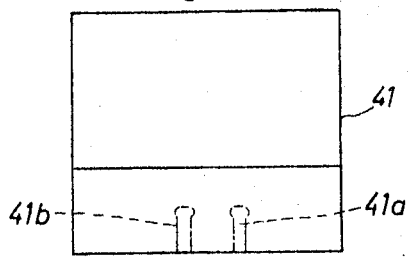
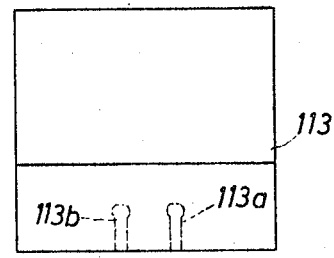
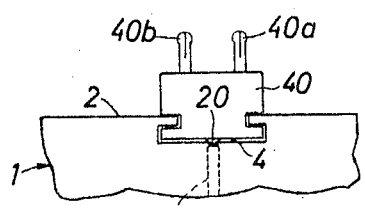
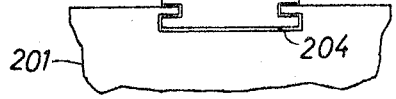
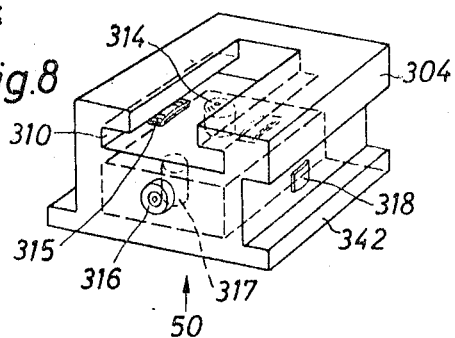

United States Patent Office 3,463,069
Patented Aug. 26, 1969

3,463,069
PHOTOGRAPHIC CAMERA FOR DAYLIGHT
AND FLASH OPERATION
Rudolf Kremp, Grunwald, Karl Wagner, Ottobrunn, Munich, Dieter Engelsmann, Unterhaching, Munich, and Alfred Winkler, Munich, Germany, assignors to Agfa-Gevaert Aktiengesellschaft, Leverkusen, Germany
Filed Aug. 23, 1966, Ser. No. 574,332
Claims priority, application Germany, Aug. 27, 1965,
A 50,116
Int. Cl. G03b 9/70
U.S. Cl. 95—11.5    20 Claims

ABSTRACT OF THE DISCLOSURE

A photographic camera whose housing carries an indexible socket for multiple flash bulb holders and a shoe or a female connector for the complementary connector of an electronic flash. The socket can be accommodated within the confines of the shoe or is accommodated in a recess which can receive an aligning device of the electronic flash. Those parts of the flash circuit which are used only for firing of flash bulbs are disconnected when the electronic flash is connected to the camera housing.

---

The present invention relates to photographic cameras for daylight or flash operation. More particularly, the invention relates to improvements in photographic cameras with built-in flash circuits.

It is an important object of the present invention to provide a photographic camera which can operate with different types of photoflash devices, for example, with a multiple flash bulb holder, with a flash gun, or with an electronic flash unit.

Another object of the invention is to provide a photographic camera of the just outlined characteristics whose flash circuit is of very simple and compact construction and wherein at least some components of the flash circuit may be used in connection with different types of photoflash devices.

A further object of the invention is to provide a photographic camera which can be readily connected with presently available photoflash devices.

An additional object of the invention is to provide a photographic camera wherein all such components which are necessary for operation with a selected photoflash device are fully concealed and protected when such selected photoflash device is replaced by a different photoflash device.

A concomitant object of the invention is to provide a photographic camera wherein the flash circuit is automatically converted for operation with a given photoflash device when such device is properly attached to the housing of the camera.

Still another object of the invention is to provide a novel flash circuit for a camera of the above outlined characteristics and to provide the camera with very simple, compact and easy-to-manipulate connecting and coupling means for various types of photoflash devices.

An auxiliary object of the invention is to provide a photoflash device with novel and improved means to facilitate its attachment to and its separation from a photographic camera of the above outlined characteristics.

A further object of the invention is to provide a photoflash device which can be attached to different types of connectors on photographic cameras of the above outlined character.

Still another object of the invention is to provide a photoflash device, particularly an electronic flash unit or a flash gun, which can be rapidly attached to or detached from our improved camera in such a way that proper attachment automatically establishes proper contact between the electrical components of the flash unit and complementary electrical components in the camera.

An additional object of the invention is to provide a novel adapter which may be utilized on the improved camera to facilitate connection of different types of photoflash devices to a certain type of camera or to facilitate connection of a given photoflash device to different types of cameras.

Briefly stated, one feature of our invention resides in the provision of a photographic camera which comprises a housing, a socket or an analogous coupling member rotatably mounted in the housing and arranged to be engaged by and to rotate with the complementary coupling member of a "Flashcube" or an analogous multiple flash bulb holder of the type having a plurality of flash bulbs angularly spaced with reference to each other, mechanical connector means (for example, a standard accessory shoe or a nut) provided on the housing and arranged to be engaged by complementary connector means provided on an electronic flash or another suitable flash unit, and electrical components provided in the housing and forming part of a flash circuit. Such components include terminals connectable with complementary terminals provided on the flash unit which is secured to the mechanical connector means.

The terminals may serve to connect in the flash circuit either a flash unit or a flash bulb forming part of a multiple flash bulb holder which is attached to the socket. Alternatively, the flash circuit may comprise additional terminals which are engaged by complementary terminals of a multiple flash bulb holder.

If the mechanical connector means comprises a shoe, the socket is preferably accommodated between the guide rails of such shoe. However, it is also possible to install the socket at a lesser or greater distance from the mechanical connector means, for example, in a suitable recess provided in the top wall of the camera housing.

The novel features which are considered as characteristic of the invention are set forth in particular in the appended claims. The improved photographic camera itself, however, both as to its construction and its mode of operation, together with additional features and advantages of our invention, will be best understood upon perusal of the following detailed description of certain specific embodiments with reference to the accompanying drawings, in which:

FIG. 5 illustrates the flash circuit of the camera shown in FIGS. 1 and 2;

FIG. 6 is a fragmentary view showing a detachable foot which may be utilized to connect a flash unit to the housing of a photographic camera;

FIG. 7 is a similar view but showing a modified foot; and

FIG. 8 is a perspective view of a special adapter which may be used to connect different types of flash units to the housing of a photographic camera.

Figure 1:
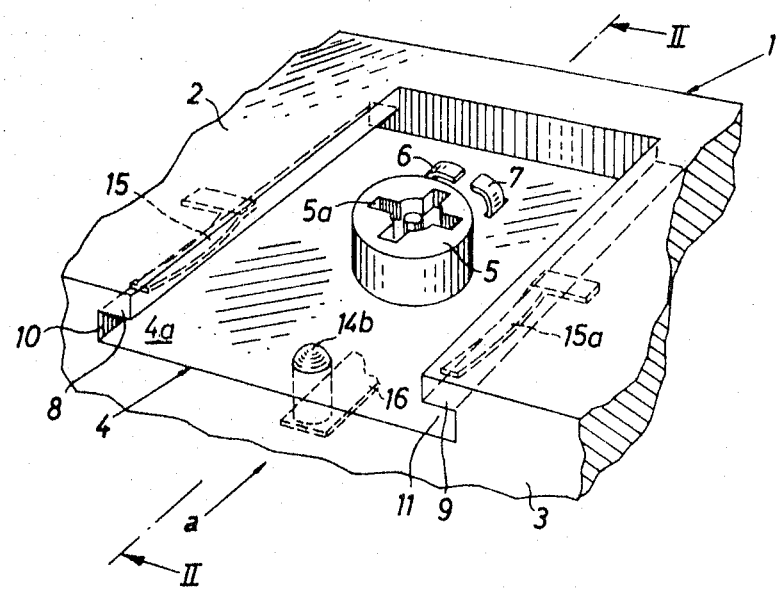
FIG. 1 is a fragmentary perspective view of a camera which embodies one form of the present invention and wherein the mechanical connector means comprises a standard shoe connectable with the foot of a flash unit.
Figure 2:
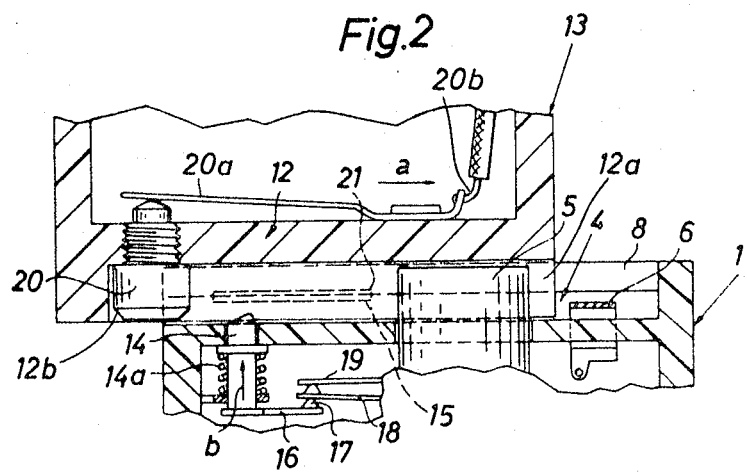
FIG. 2 is a vertical section as seen in the direction of arrows from the line II—II of FIG. 1 and further shows a portion of a flash unit which is partially connected to the housing of the camera.

Referring first to FIGS. 1 and 2, there is shown the housing 1 of a photographic camera whose top wall 2 is provided with an accessory shoe 4 constituting a mechanical connector engageable by the complementary connector or foot 12 on the casing 13 of a flash unit, for example, an electronic flash unit. This shoe 4 has an inlet located in the upper edge portion of the rear wall 3 of the housing 1 and comprises two parallel guide rails 8, 9 defining wtih the housing 1 a pair of elongated guide grooves 10, 11.

The central portion of the shoe 4 accommodates a female coupling member here shown as a rotary socket 5 which extends beyond the bottom surface 4a of the shoe and is formed with a cruciform recess 5a adapted to receive a complementary coupling member, preferably the plug of a commercially available multiple flash bulb holder. For example, the multiple flash bulb holder may be of the type sold under the name of "Flashcube" and having four angularly spaced equidistant flash bulbs 26 (see FIG. 5) each of which is located in front of a reflector. The base of such multiple flash bulb holder carries four pairs of complementary electric terminals 26a, 26b, one pair for each flash bulb 26. The housing 1 accommodates a suitable indexing mechanism (not shown) which can rotate the socket 5 through angles of 90 degrees, for example, in response to successive manipulations of the film transporting mechanism, to place successive flash bulbs 26 of the "Flashcube" into an optimum position for making exposures with flash. The construction of such indexing and film transporting mechanisms forms no part of the present invention.

The socket 5 is adjacent to a pair of fixed but preferably elastic electric terminals 6, 7 which are disposed in the space between the guide rails 8, 9 and are engaged by that pair of complementary terminals 26a, 26b on the base of a "Flashcube" attached to the socket which can connect into the flash circuit 22 a selected flash bulb 26, namely, that flash bulb which faces the subject. In other words, a flash bulb 26 in the multiple flash bulb holder which has been attached to the socket 5 can be fired only when the corresponding complementary terminals 26a, 26b of the multiple flash bulb holder engage the terminals 6, 7 in the shoe 4.

When the multiple flash bulb holder is detached from the socket 5, the shoe 4 can be connected with the complementary connector or foot 12 of the aforementioned casing 13. As stated before, the casing 13 may form part of an electronic flash unit but it is equally possible to connect the shoe 4 with the foot of a flash gun using a single flash bulb which is larger than the flash bulbs 26 of a "Flashcube."

The foot 12 of the casing 13 has two outwardly extending guide ribs 12a (one shown in FIG. 2) each of which slides in one of the grooves 10, 11 when the foot is properly introduced into the shoe 4 and is advanced in the direction indicated by an arrow a. Retaining springs 15, 15a which are provided in the grooves 10, 11 will be deformed by the respective rails 12a to prevent uncontrolled separation of the flash unit from the housing 1. One of these retaining springs, namely, the spring 15, preferably constitutes an electric terminal and is engageable by a complementary terminal 21 of the casing 13. The other terminal includes a metallic plate 16 mounted at the inner end of a motion transmitting stud 14 which is reciprocable in the top wall 2 and constitutes an electrical conductor. The stud 14 is biased upwardly by a helical spring 14a so that its bevelled tip 14b tends to extend into the space between the guide rails 8, 9. This motion transmitting conductor or stud 14 is located substantially centrally within the confines of the shoe 4 and is disposed behind the socket 5, i.e., nearer to the rear wall 3.

The flash circuit 22 (see FIG. 5) of the camera includes the aforementioned terminals 6, 7 and 15, 16. This flash circuit further comprises a control switch including a fixed contact 19 and a movable contact 18, the latter tending to move away from the contact 19. A projection 17 on the terminal 16 maintains the contact 18 in engagement with the contact 19 when the spring 14a is free to expand, i.e., when the foot 12 is detached from the shoe 4. However, when the foot 12 is properly attached to the guide rails 8, 9, a complementary terminal 20 of the casing 13 depresses the stud 14 against the opposition of the spring 14a whereby the contact 18 is free to move away from the contact 19. In other words, the stud 14 constitutes a motion transmitting element which can move or can effect movement of the control switch 18, 19 from a first position (shown in FIG. 2) to a second position (shown in FIG. 5) in response to attachment of the foot 12 to the shoe 4.

The underside of the foot 12 is formed with a centrally located longitudinally extending channel 12b which is wide and deep enough to accommodate the socket 5 when the foot is slid into the shoe 4. The channel 12b further accommodates the terminals 6, 7 so that all such components which are useful and necessary when the camera is to make exposures with flash by firing the flash bulbs 26 of a multiple flash bulb holder but are idle when the multiple flash bulb holder is detached from the socket 5 will be fully concealed by the foot 12.

The rearmost portion of the channel 12b accommodates the head of the aforementioned complementary terminal 20 which resembles a bolt threaded into the casing 13 and engaging an elastic conductor 20a in the interior of the casing. The conductor 20a is connected with one end of a lead 20b. As stated before, the head of the complementary terminal 20 will depress the stud 14 when the foot 12 is fully attached to the shoe 4, FIG. 2 shows the foot 12 in an intermediate position in which the socket 5 is already accommodated in the channel 12b but the head of the terminal 20 is still located rearwardly of the stud 14. The terminal 20 can move the stud 14 downwardly (i.e., counter to the direction indicated in FIG. 2 by an arrow b) so that the terminal 16 moves downwardly and its projection 17 allows the contact 18 to move away from the contact 19 and to assume the position 18x shown in FIG. 8 by phantom lines. The contact 18 is resilient and automatically moves away from the contact 19 when the spring 14a is caused to contract. When the head of the terminal 20 engages and depresses the motion transmitting stud 14, the lead 20b is connected with the contact 18 (in the position 18x) in a manner as shown in FIG. 5. Since the complementary terminal 21 also engages the terminal 15, the flash unit which includes the casing 13 and foot 12 is connected in the flash circuit 22 of the camera. If the operator thereupon depresses the release trigger T which is used to open the shutter and to close a synchronizing switch 27, the camera will make an exposure with illumination furnished by the flash unit including the casing 13.

The exact construction of the remainder of the flash unit which includes the casing 13 forms no part of the present invention. All that counts is to provide the camera with a first coupling member (socket 5) which can be engaged by a complementary coupling member, such as the plug of a multiple flash bulb holder, to provide the camera with a mechanical connector (shoe 4) which can be engaged by a complementary connector (foot 12) of a flash unit other than a multiple flash bulb holder, to provide terminals (15, 16) which can be placed into current conducting engagement with complementary terminals (20, 21) of the flash unit when the latter is properly attached to the shoe 4, and to provide in the housing 1 a flash circuit 22 which includes the terminals 15, 16 and, if necessary, additional or separate terminals (6, 7) to allow for connection of flash bulbs 26 into such circuit.

As shown in FIG. 5, the components of the flash circuit 22 further include a battery 25 or an analogous source of electrical energy, a customary capacitor 23, a resistor 24, and the synchronizing switch 27. The components 23, 24, 7, 6 and 25 are connected in series. The control switch 18, 19 is shown in that position in which the contact 18 engages the contact 19. This contact 18 is electrically connected with the stud 14 by the terminal 16. The terminal 15 is connected with the fixed contact of the synchronizing switch 27.

The contact 18 will engage the contact 19 when the foot 12 is detached from the shoe 4 so that the synchronizing switch 27 is then connected in circuit with the battery 25. The camera is ready to make exposures by firing flash bulbs 26 which are installed in a multiple flash bulb holder connected to the socket 5. The complementary terminals 26a, 26b for the flash bulb 26 engage the terminals 6, 7 when the respective flash bulb is properly oriented with reference to the subject, i.e., when the socket 5 has been indexed to assume an angular position in which the flash bulb 26 faces the subject.

The flash unit including the casing 13 will be ready for use when its terminals 20, 21 are respectively connected with the terminals 16, 15, i.e., when the multiple flash bulb holder has been detached from the socket 5 and when the stud 14 has been depressed against the opposition of the spring 14a to thereby effect movement of the contact 18 of the control switch to the position 18x in which the battery 25 is disconnected from the synchronizing switch 27. The capacitor 23 and resistor 24 are also disconnected so that the components 23–25 cannot be damaged when the camera is used to make exposures with illumination furnished by the flash unit connected to the shoe 4.

Figure 4:
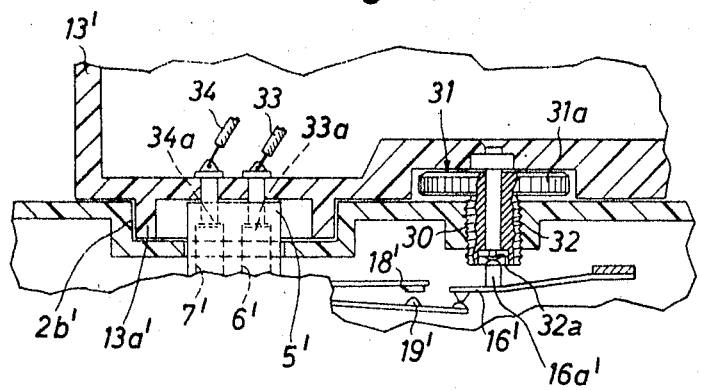
FIG. 4 is a vertical section as seen in the direction of arrows from the line IV—IV of FIG. 3, and further shows a portion of a flash unit which is attached to the housing of the camera.
Figure 3:
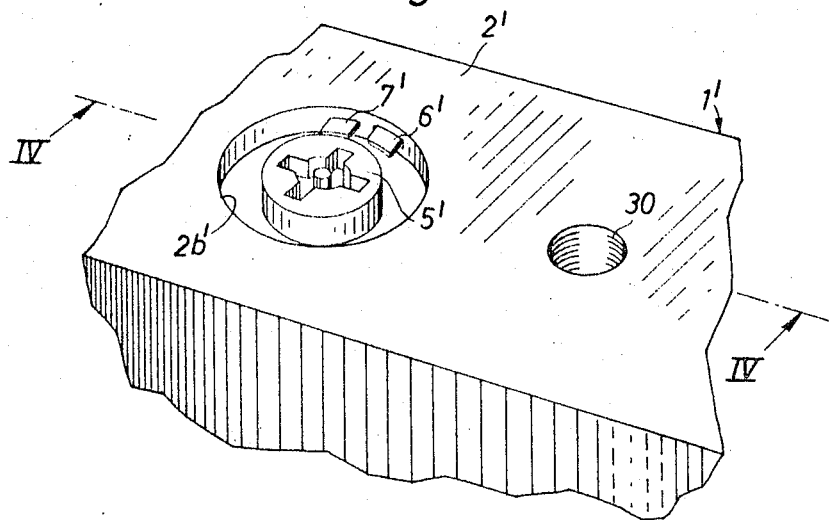
FIG. 3 is a fragmentary perspective view of a modified camera wherein the mechanical connecter means comprises a nut.

FIGS. 3 and 4 illustrate the housing 1' of a modified camera whose top wall 2' is provided with an internally threaded extension or nut 30 extending into the interior of the housing 1' and constituting a female mechanical connector adapted to mesh with the stem 32 of a screw-shaped complementary connector 31 whose knurled head 31a extends laterally from the casing 13' of an electronic flash unit or a flash gun. Thus, a portion of the head 31a is accessible when the casing 13' is placed onto the top wall 2' so that the user can rotate the connector 31 in order to introduce the stem 32 into the nut 30 and to thus secure the flash unit to the camera.

The socket 5' is accommodated in a circular recess 2b' of the top wall 2' so that it does not extend beyond the upper side of this wall. The terminals 6', 7' (corresponding to the terminals 6, 7 of FIG. 1) are adjacent to the socket 5' and are also accommodated in the recess 2b'. The casing 13' is provided with a downwardly extending aligning portion 13a' which enters the recess 2b' when the stem 32 meshes with the nut 30.

A resilient terminal 16' is provided in the housing 1' at a level below the nut 30 and has an upwardly extending projection 16a' which is engaged and depressed by a centrally located motion transmitting portion 32a of the stem 32. When the stem 32 is fully introduced into the nut 30, terminal 16' causes the contact 19' to move away from the contact 18'. The terminals 6', 7' are then engaged by complementary terminals 33a, 34a of two leads 33, 34 in the casing 13' so that the flash unit is connected in the flash circuit of the camera. The terminals 6', 7' correspond to the terminals 6, 7 of FIG. 1 and also perform the function of terminals 15, 16 of FIG. 1. The terminals 33a, 34a are analogous to the terminals 20, 21 of FIG. 2. The battery 25 (not shown in FIGS. 3 and 4) remains connected in circuit with the synchronizing switch when the casing 13' is properly attached to the housing 1' so that this flash unit need not comprise a separate source of electrical energy. Alternatively, and if the casing 13' accommodates one or more batteries or the like, such batteries may be connected with the battery 25. It is also possible to install the control switch 18', 19' of FIG. 4 in such a way that the battery 25 is automatically disconnected when the casing 13' is properly attached to the housing 1' provided, of course, that the flash unit which includes the casing 13' has a separate source of electrical energy.

FIG. 6 illustrates a flash unit whose casing 41 is separable from an adapter or foot 40 which is receivable in the shoe 4 of the housing 1. The foot 40 has two upwardly etxending projections or prongs 40a, 40b which are receivable in complementary openings or holes 41a, 41b of the casing 41. This casing 41 can form part of a conventional flash gun for a single flash bulb. One of the prongs 40a, 40b can establish an electrical connection between the centrally located terminal 20 in the foot 40 and a conductor corresponding to the conductor 20a of FIG. 2. The other prong then establishes an electrical connection between the terminal 15 (not shown in FIG. 6) and a terminal corresponding to the terminal 21 of FIG. 2 and provided in the casing 41.

If the housing 201 of a camera is provided with a relatively wide shoe 204, the foot 40 of FIG. 6 may be replaced by a wider adapter or foot 42 which is shown in FIG. 7. The distance between the prongs 42a, 42b of this foot 42 is the same as the distance between the prongs 40a, 40b so that the casing 113 of an electronic flash unit can be connected to such relatively wide shoe 204. Shoes for electronic flash units might be wider than shoes which are to be connected with the foot of a flash gun, or vice versa. The adapters 40, 42 will enable the photographer to use the camera with three different photoflash devices, namely, a flash gun, a multiple flash bulb holder, and an electronic flash unit.

Referring finally to FIG. 8, there is shown a special adapter 50 which enables the operator to connect a camera with different types of photoflash devices (for example, with an electronic flash unit or with a flash gun) or to connect a given photoflash device with several types of camera housings. The adapter 50 comprises a foot 342 which can be received in a relatively wide shoe (such as the shoe 204 of FIG. 7) and this adapter further comprises a shoe 304 which is dimensioned in the same way as the shoe of FIG. 6 so that it can take the adapter 40 or the foot 12. One terminal of the shoe 304 is shown at 315 and is accommodated in the groove 310. The terminal 315 is electrically connected with the terminal 318 of the foot 342. The other terminal 314 of this shoe is in contact with a centrally located motion transmitting stud 317 of the foot 342.

If a camera having a housing 201 of the type shown in FIG. 7 is furnished with the adapter 50, the owner can use a flash unit whose casing 13 is provided with an integral foot 12 (which is introduced into the shoe 304), a flash unit whose casing 41 can be attached to the adapter 50 by means of a separable foot 40, a flash unit whose casing 113 is connected with the foot 42 (which is introduced directly into the shoe 204 so that the adapter 50 need not be used), or with any other flash unit which can be attached directly to the housing 201, directly to the adapter 50, or which can be attached to the adapter 50 by resorting to the foot 40.

If the flash unit which is connected to the adapter 50 has a customary synchronizing cable, not shown, the adapter 50 can also be provided with a socket 316 for the end of this cable. One pole of the socket 316 is in contact with the terminal 318, the other pole of the socket 316 is connected with the stud 317.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is:

1. In a photographic camera, a housing; mechanical connector means provided on said housing; a flash unit having complementary connector means separably engaging said mechanical connector means; and a first coupling member rotatably mounted within said mechanical connector means in such position as to permit engagement and disengagement of said complementary connector means, said first coupling member being arranged to be engaged by and to rotate with the complementary coupling member of a multiple flash bulb holder of the type having a plurality of flash bulbs angularly spaced with reference to each other.

2. A structure as defined in claim 1, wherein said mechanical connector means comprises a shoe provided with a pair of spaced guide rails and wherein said first coupling member is accommodated in said shoe between said guide rails.

3. A structure as defined in claim 1, further comprising electrical components forming part of flash circuit means provided in said housing, said components including first terminals connected with complementary terminals provided on said flash unit.

4. A structure as defined in claim 1, wherein said mechanical connector means comprises an internally threaded female connector and said complementary connector means comprises a manually rotatable externally threaded male connector.

5. A structure as set forth in claim 1, wherein said first coupling member is a socket having a recess adapted to accommodates the plug-shaped complementary coupling member of a multiple flash bulb holder.

6. A structure as set forth in claim 3, wherein said electrical components further include a source of electrical energy, synchronizing switch means arranged to connect said source in circuit with one flash bulb of a multiple flash bulb holder which is attached to said first coupling member when the camera makes an exposure, control switch means movable between first and second positions to respectively connect and disconnect said source from said circuit, and motion transmitting means arranged to move said control switch means to second position in response to attachment of said flash unit to said mechanical connector means.

7. A structure as set forth in claim 3, wherein said first terminals are adjacent to said first coupling member.

8. A structure as set forth in claim 3, wherein said flash circuit means further comprises a source of electrical energy, synchronizing switch means for connecting said source in circuit with one flash bulb of that multiple flash bulb holder which is atatched to said first coupling member when the camera makes an exposure, control switch means movable between a first position in which said source is connected in circuit with said synchronizing switch means and a second position in which said synchronizing switch means is connected in circuit with said first terminals, and motion transmitting means for moving said control switch means to second position in response to attachment of said flash unit to said mechanical connector means.

9. A structure as set forth in claim 8, wherein said motion transmitting means comprises a spring-biased motion transmitting member engageable by the complementary connector means of said flash unit.

10. A structure as set forth in claim 8, wherein said motion transmitting means is engageable by a complementary terminal of said flash unit.

11. A structure as set forth in claim 8, wherein said motion transmitting means comprises a stud-shaped electrical conductor.

12. A structure as set forth in claim 11, wherein said mechanical connector means comprises a shoe and said electrical conductor is disposed substantially centrally within the confines of said shoe.

13. In a photographic camera, a housing provided with an accessory shoe; an electric connector socket for multiflash bulb holders mounted in said shoe; and a photoflash unit including a casing, a foot carried by said casing and removably received in said shoe, said foot having an underside provided with a longitudinally extending channel which is wide and deep enough to accommodate said socket, and an electric terminal provided on said foot and extending into said channel.

14. A structure as set forth in claim 13, wherein said photoflash unit is an electronic flash unit.

15. A structure as set forth in claim 13, wherein said terminal is adjacent to one end of said channel.

16. A structure as set forth in claim 13, wherein said foot is detachable from said casing.

17. A structure as set forth in claim 16, wherein said foot is provided with projections removably extending into complementary openings of said casing.

18. A structure as set forth in claim 3, further comprising additional terminals forming part of said flash circuit means and arranged to be engaged by complementary terminals provided on the multiple flash bulb holder which is attached to said first coupling member.

19. A structure as set forth in claim 8, wherein said mechanical connector means comprises a shoe and said first mentioned terminals include a pair of terminals at least one of which is accommodated in said shoe.

20. A structure as set forth in claim 19, wherein said shoe comprises a pair of spaced guide rails each defining with said housing a groove and wherein said first coupling member comprises a rotary socket located between said guide rails, said additional terminals being adjacent to said socket in said shoe and one of said first terminals being accommodated in one of said grooves, the other of said first terminals being disposed between said guide rails.

References Cited

UNITED STATES PATENTS

| | | | |
|---|---|---|---|
| 2,972,673 | 2/1961 | Graef | 240—1.3 |
| 3,252,394 | 5/1966 | Jakob et al. | 95—11 |
| 3,286,612 | 11/1966 | Lieser | 95—11 |
| 3,312,086 | 4/1967 | Casebeer et al. | 95—11.5 |
| 3,318,215 | 5/1967 | Schiks | 95—11.5 |
| 3,319,548 | 5/1967 | Kottler | 95—11 |
| 3,353,465 | 11/1967 | Peterson et al. | 95—11.5 |
| 3,232,194 | 2/1966 | Ostrow | 95—11.5 |

NORTON ANSHER, Primary Examiner

CHARLES E. SMITH, Assistant Examiner

U.S. Cl. X.R.

240—1.3